Oct. 30, 1962     C. H. BRADBURY     3,061,106
FILTERS
Filed April 8, 1960     2 Sheets-Sheet 1
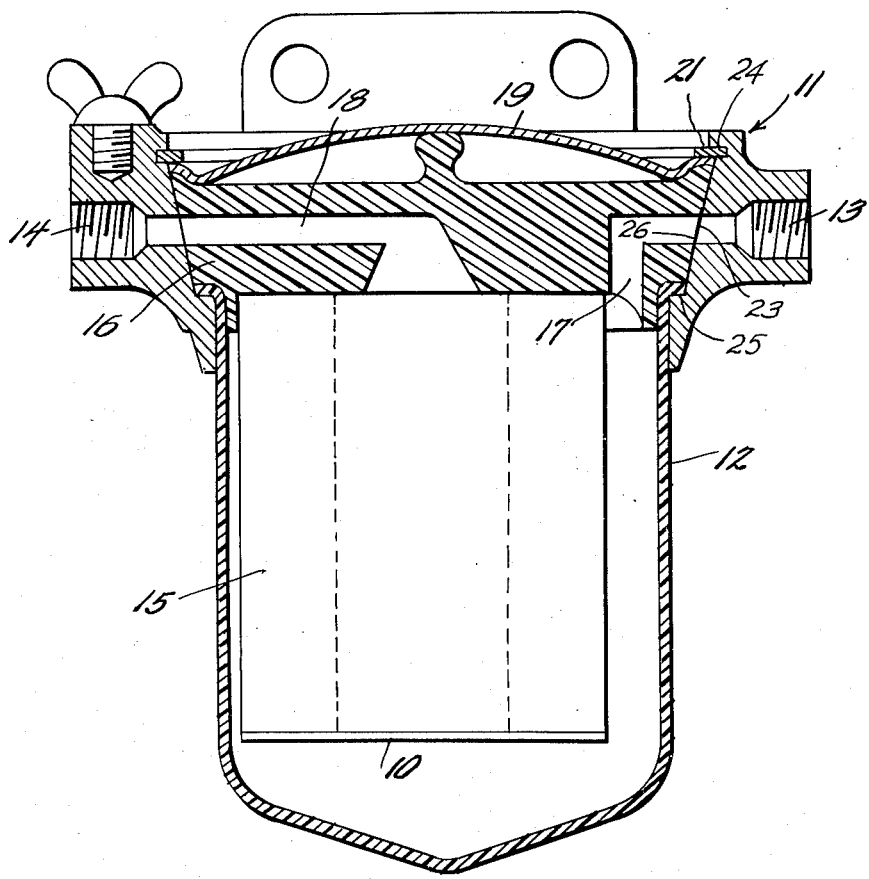
INVENTOR
Cyril Henry Bradbury
BY
Watson, Cole, Grindle & Watson
ATTORNEYS

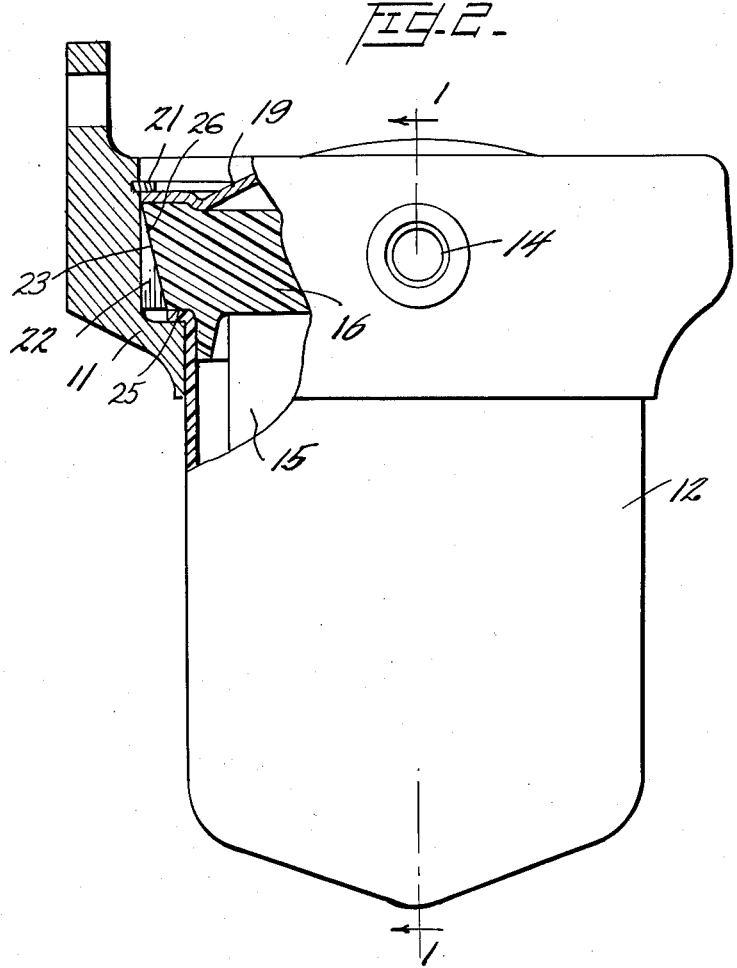

United States Patent Office 3,061,106
Patented Oct. 30, 1962

3,061,106
FILTERS
Cyril Henry Bradbury, London, England, assignor to Simms Motor Units Limited, London, England, a British company
Filed Apr. 8, 1960, Ser. No. 21,030
Claims priority, application Great Britain Apr. 13, 1959
1 Claim. (Cl. 210—232)

The invention relates to filters and is more particularly, but not exclusively, concerned with oil filters e.g. for internal combustion engines.

The invention provides a removable and replaceable unit for a filter, which unit comprises a filter element secured to a support member adapted to co-operate with a container, through which support member passes a conduit or opening adapted for co-operation with a conduit or opening carried by the container to provide at least part of an inlet or outlet passage for the filter.

Preferably the filter element is of hollow formation and the said conduit or opening in the support member communicates with the interior of the filter element. Preferably the support member is formed with a conduit which communicates at one end with the interior of the filter element and is adapted for communication at its other end with the said conduit or opening carried by the container.

The invention includes a filter comprising, in combination, a container having at least one conduit or opening, and a unit as aforesaid. Preferably the support member interfits with the container and is supported thereby. Preferably the support member is clamped between the container and a cover therefor.

A specific construction of an oil filter, and a replacement unit therefor, embodying the invention will now be described by way of example and with reference to the accompanying drawings in which:

FIGURE 1 is a vertical sectional view of a filter, taken on the line 1—1 in FIGURE 2, and FIGURE 2 is a side view of that filter, partly broken away.

In this example the container comprises a body part 11 and a lower part 12 which is in the form of a bowl of transparent "Perspex" material. The body 11 has formed in it an inlet conduit means 13 and an outlet conduit means 14. The body 11 has an opening therethrough which is defined by an interior marginal wall 23 converging downwardly from the mouth 24, and by an upwardly presented shoulder 25 spaced below said mouth 24. The filter element or medium 15, which is of paper, is moulded into a top member 16 of rubber or plastic material, and into a bottom member 10 of similar material. The top member 16 is formed with passages in the form of inlet and outlet conduit means 17 and 18 which communicate respectively with the inlet conduit means 13 and the outlet conduit means 14 for guiding oil from the inlet 13 to pass through the filter element 15 and thence to the outlet 14. The top member 16 is shaped around its periphery with a downwardly converging external marginal wall 26 in conforming sealing engagement with the marginal wall 23 and is clamped in position by a plate 19 and a circlip 21 engaging within a groove in the body 11. The plate 19 and circlip 21 thus function as abutment means for maintaining the top member 16 against upward displacement. The member 16 thus serves to clamp the bowl 12 in position and also provides an oil-tight seal with the body 11.

The member 16 has an integral projection 22 which interfits with a correspondingly shaped recess formed in the body 11 to locate the member 16 in the correct position in relation to the inlet 13 and the outlet 14.

In use, the filter is connected into the fuel oil system of an internal combustion engine by means of pipes connected to the inlet 13 and the outlet 14. The filter element and the member 16 may be readily removed, e.g. for servicing or renewal of the filter element, by first removing the circlip 21 and the plate 19 and then merely lifting the member 16 and the filter element 15 as a unit from the container, without any necessity for emptying the oil from the filter bowl 12 and without disturbing the connection of the pipes to the inlet 13 and the outlet 14.

The invention is not restricted to the details of the foregoing examples.

I claim:

A filter structure comprising a body formed with an opening therethrough defined by an interior marginal wall converging downwardly from the mouth of said opening and an upwardly presented shoulder spaced below said mouth, said body having inlet and outlet conduit means opening radially through said wall above said shoulder, a filter bowl removably depending through said opening and having an outwardly projecting flange at its upper end supported on said shoulder, a top member removably disposed in said opening below the mouth thereof, and in abutting sealing engagement with said flange and also clamping the bowl in position with the flange against said shoulder, said top member also having a downwardly converging external marginal wall in conforming sealing engagement with said first marginal wall, and abutment means removably positioned in said opening above and engaging the top member for maintaining said top member against upward displacement, said top member having separate inlet and outlet conduit means communicating respectively with and constituting continuations of said first inlet and outlet conduit means, a hollow filter element permanently secured to said top member and supporting therefrom with the filter bowl, said inlet conduit means opening into the bowl exteriorly of the filter element, and said inlet conduit means opened to the interior of said hollow filter element.

References Cited in the file of this patent
UNITED STATES PATENTS

| | | |
|---|---|---|
| 1,590,128 | Staples | June 22, 1926 |
| 2,028,061 | Goldman | Jan. 14, 1936 |
| 2,565,690 | Ketelsen | Aug. 28, 1951 |